April 5, 1960 J. K. BROWN 2,931,866

ELECTRICAL SWITCHES

Filed Nov. 12, 1957 2 Sheets-Sheet 1

Inventor
J. K. Brown
By Glascock Downing Seebold Attys.

April 5, 1960 J. K. BROWN 2,931,866

ELECTRICAL SWITCHES

Filed Nov. 12, 1957 2 Sheets-Sheet 2

Inventor
J. K. Brown
By Glascock Downing & Seebold
Attys.

United States Patent Office 2,931,866

Patented Apr. 5, 1960

2,931,866

ELECTRICAL SWITCHES

John K. Brown, London, England, assignor to A.B. Metal Products Limited, London, England Application November 12, 1957, Serial No. 695,638

Claims priority, application Great Britain November 12, 1956

3 Claims. (Cl. 200—16)

This invention relates to switches and more particularly, but not solely, to switches for use in association with printed circuits.

A conventional rotary action wafer switch comprises an actuating spindle having a carrier member for sliding contacts mounted thereon for rotation therewith and fixed contacts adapted to co-operate with selected sliding contacts according to the position of the actuating spindle.

Such a switch, especially when, as is a frequent occurrence, several wafers are ganged together on a single spindle, is clearly unsuitable for use in conjunction with printed circuits, and it is an object of the present invention to provide a switch to replace the rotary-action wafer switch for use with printed circuits.

According to the invention there is provided electrical switching means comprising a fixed contact carrier member formed of a strip of insulating material having at least one series of holes punched therein on a module system, fixed contacts mounted on said fixed contact carrier member by at least some of the holes of said series, a movable contact carrier member formed of a strip of insulating material having first and second series of holes punched therein, said series being punched on a module system compatible with the module system on said fixed contact carrier member, contact members mounted in at least some of said first series of holes for co-operation with said fixed contacts, rack means comprising a strip of rigid material having a series of holes punched therein on a compatible module system and a series of securing lugs therein spaced on a module system for co-operation with selected holes of said second series on said movable contact carrier member to secure said rack means thereto, operable spindle means, wheel means rotatable with said spindle means, said wheel means having teeth co-operable with the holes in said rack means, and indexing means for location of the wheel means and rack means so that rotation of said wheel means by said spindle means from one indexed position to another indexed position translates the movable contacts by a distance equal to the distance between two adjacent co-operating holes of said rack means.

The invention will be further described with reference to one embodiment as illustrated in the accompanying drawings wherein.

Figure 1:
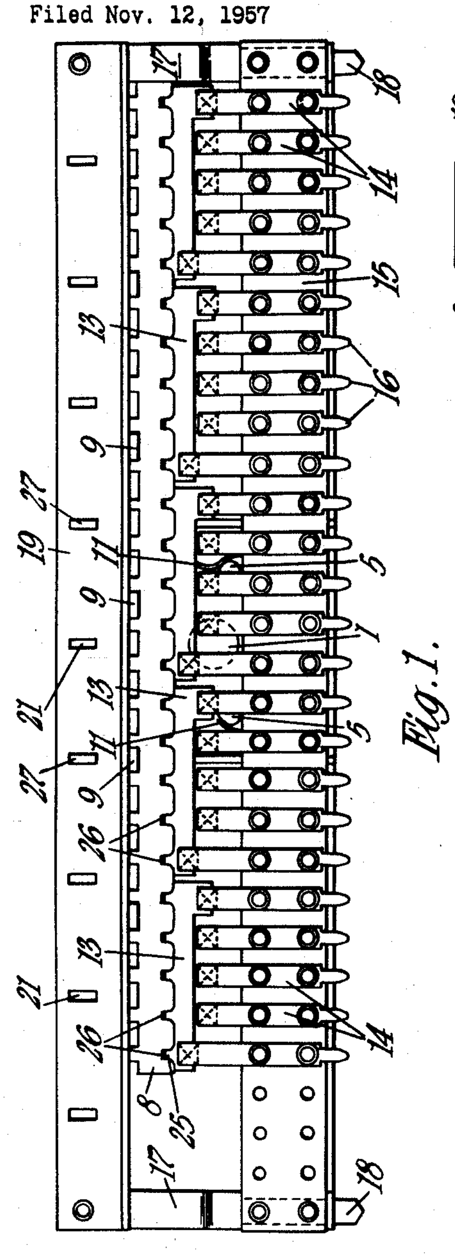
Figure 1 is an elevation of a switch according to the invention.

Reference numeral 1 denotes an actuating spindle journalled in a bushing 2 mounted on a bracket 3. Spindle 1 is formed at its outer end to accommodate a control knob of any convenient type. Bracket 3 is formed at its lower end with a plurality of lugs (not shown) which are adapted to project through a printed circuit panel (not shown) and be bent or twisted so as to form a mounting for bracket 3 on the panels. Spindle 1 is located in bushing 2 by means of a pair of C-washers 4 located in grooves 23 in the spindle and abutting the ends of bushing 2.

Mounted on the spindle 1 for rotation therewith is a toothed wheel or plate 5, the teeth of which engage successively with holes 6 formed in an L-shaped rack slider 7 to move the slider 7 within L-shaped slots 24 in bracket 3. The slider 7 is secured to a sliding contact carrier 8 by means of lugs 9 extending therethrough and twisted or bent after assembly. Leaf springs 11 are mounted on bracket 3 and are adapted to locate and index toothed wheel 5. Pegs 12 are located in appropriate holes of rack slider 7 to engage the side walls of bracket 3 and restrict the motion of the rack slider. On carrier 8 are located a plurality of sliding contacts 13 secured by twisted lugs 25 through holes 26 and co-operating with group of fixed contacts 14 mounted on an insulating carrier 15, preferably by two rivets as shown, and having extended end portions 16 arranged to project through the printed circuit panel when the switch is in position therein. The end portions 16 are dip-soldered for protection during storage and to facilitate their incorporation into the printed circuit. Each contact 14 consists of two identical portions between which the contacts 13 are arranged to pass.

Figures 2, 3:
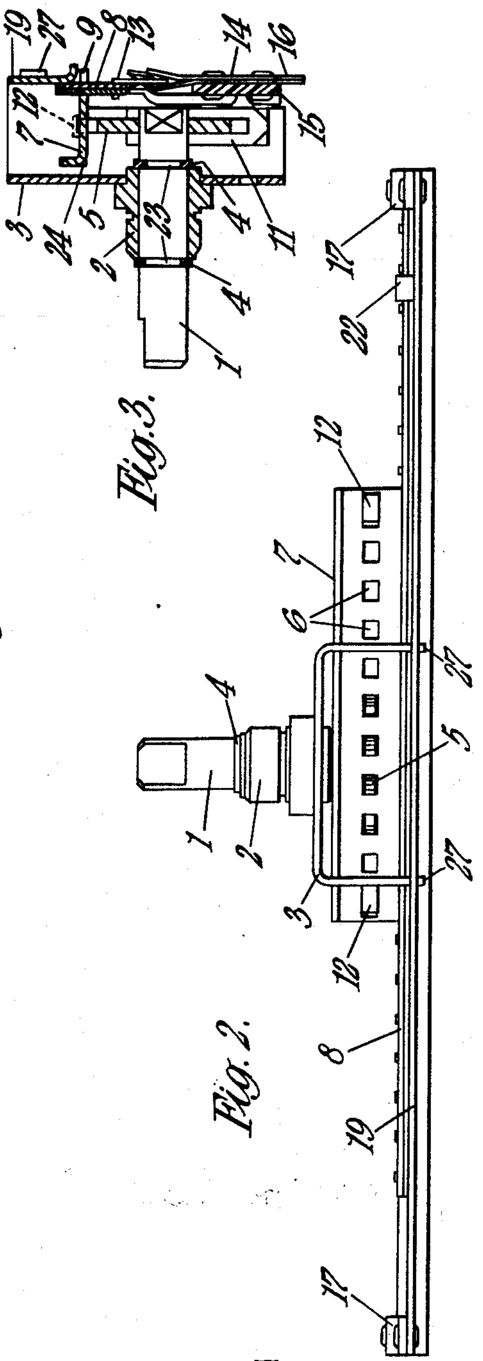
Figure 2 is a plan view thereof.
Figure 3 is a sectional end view thereof.
Figure 4:
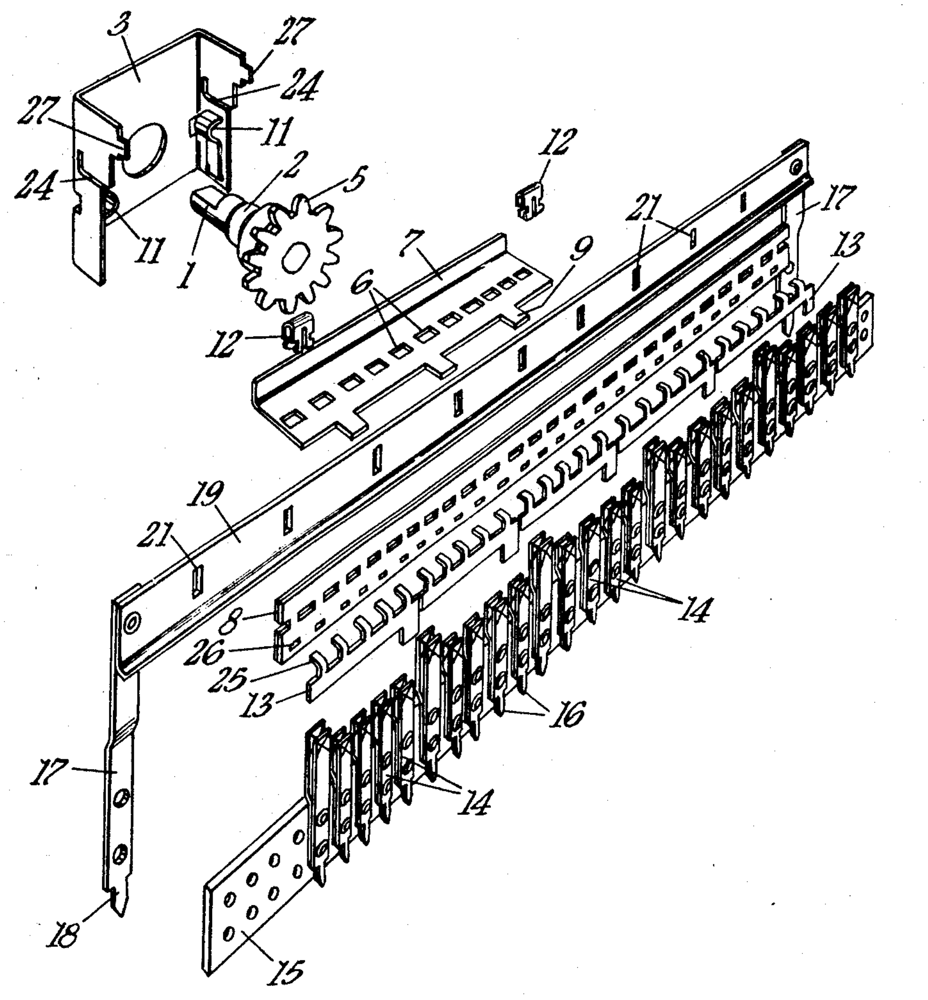
Figure 4 is an exploded perspective view thereof.

Carrier 15 is secured at its ends to end bars 17 having lugs 18 extending through the printed circuit panel to ensure greater rigidity of switch and panel, the end bars 17 also being secured to a connecting bar 19 of sheet metal, such as aluminium, to which is also secured the bracket 3 by means of lugs 27 extending through the pre-stamped holes 21. Guides such as 22 (shown in Figure 2 only) may be inserted through otherwise unused holes 21 to keep rack slider 7 in its prescribed horizontal path.

From the foregoing description it will be clear that the rack slider, the slider contact carrier, the fixed contact carrier and the connecting bar may all be pre-formed in ready-punched strips and cropped to lengths when and how required. Thus from the switch manufacture point of view no objections arise as to the number of poles a switch may have, as the strips are just cut to the requisite length. Also while a fourway switch has been illustrated, there is clearly no restriction to such a switch as a limitless variety of combinations of fixed and moving contacts may be used.

For the purposes of standardization and interchangeability combined with the necessary versatility in switching sequences, the piercings necessary in the panel follow a distinct "module" system.

Thus the switch as described is amenable to mass-production methods and is also of wide application in printed circuitry and elsewhere.

It will be realised that although the switch is described fundamentally for printed circuit application, it can be used in conventional wiring with advantages over the conventional rotary wafer switches, such as: (*a*) All soldering to be done can be arranged in easily accessible position. (*b*) The number of positions available is independent of the index angle. In normal rotary switches the number of positions is limited to the number of index angles included in 360°.

It will also be understood that the switch as described is easily capable of being ganged as by repeating the electrical section of the switch and extending the legs 9 from the rack slider 7 to carry one or more further sliding contact carriers.

What is claimed is:

1. Electrical switching means comprising a fixed contact carrier member formed of a strip of insulating material having at least one series of holes punched therein on a module system, fixed contacts mounted on said fixed contact carrier member by at least some of the holes of said series, a movable contact carrier member formed of a strip of insulating material having first and second series of holes punched therein, said series being punched on a module system compatible with the module system on said fixed contact carrier member, contact members mounted in at least some of said first series of holes for co-operation with said fixed contacts, rack means comprising a strip of rigid material having a series of holes punched therein on a compatible module system and a series of securing lugs therein spaced on a module system for co-operation with selected holes of said second series on said movable contact carrier member to secure said rack means thereto, operable spindle means, wheel means rotatable with said spindle means, said wheel means having teeth co-operable with the holes in said rack means, and indexing means for location of the wheel means and rack means so that rotation of said wheel means by said spindle means from one indexed position to another indexed position translates the movable contacts by a distance equal to the distance between two adjacent co-operating holes of said rack means.

2. Electrical switching means as claimed in claim 1, further comprising end bars secured in otherwise spare holes of the series on said fixed contact carrier member, a connecting bar interconnecting said end bars parallel with said fixed contact carrier member and punched with holes on a further compatible module system, U-shaped bracket means having a base and legs, said legs each having lugs thereon to co-operate with separate holes in said connecting bar to secure the bracket means thereto, said bracket means having aligned slits in the legs thereof to slidably support said rack means for translation transversely of said bracket means, said spindle being journalled in the base of said U-shaped bracket means.

3. Electrical switching means as claimed in claim 2, further comprising stop means mounted in otherwise spare holes in the rack means, said stop means being adapted to co-operate with the legs of said bracket means to limit transverse translation of the rack means.

References Cited in the file of this patent

UNITED STATES PATENTS

| | | |
|---|---|---|
| 530,465 | VanVleck | Dec. 4, 1894 |
| 1,341,372 | Kissell | May 25, 1920 |
| 1,919,207 | Douglas | July 25, 1933 |
| 1,956,422 | Hammerly | Apr. 24, 1934 |
| 2,368,083 | Adam | Jan. 30, 1945 |
| 2,541,917 | DeMers | Feb. 13, 1951 |

FOREIGN PATENTS

| | | |
|---|---|---|
| 598,129 | Great Britain | Feb. 11, 1948 |